United States Patent [19]
Matsuzawa

[11] Patent Number: 5,531,371
[45] Date of Patent: Jul. 2, 1996

[54] PROCESS OF PREPARING CLAD CONTACT MATERIAL

[75] Inventor: Osamu Matsuzawa, Kanagawa, Japan

[73] Assignee: Tanaka Kikinzoku Kogyo, K.K., Japan

[21] Appl. No.: 355,554

[22] Filed: Dec. 14, 1994

[30] Foreign Application Priority Data

Dec. 15, 1993 [JP] Japan .................................. 5-343045

[51] Int. Cl.$^6$ .......................... B23K 31/02; B23K 103/08
[52] U.S. Cl. ....................... 228/175; 228/231; 228/262.6; 29/877; 148/527
[58] Field of Search ............................... 228/231, 262.6, 228/175; 29/876, 877; 148/527

[56] References Cited

U.S. PATENT DOCUMENTS

| | | | |
|---|---|---|---|
| 2,758,267 | 8/1956 | Short | 29/877 |
| 3,821,848 | 7/1974 | Backstrom | 29/877 |
| 3,997,099 | 12/1976 | Morisaki | 228/231 |

FOREIGN PATENT DOCUMENTS

| | | | |
|---|---|---|---|
| 60-238464 | 11/1985 | Japan | 228/262.6 |
| 63-89039 | 4/1988 | Japan | 148/527 |

*Primary Examiner*—P. Austin Bradley
*Assistant Examiner*—Jeffrey T. Knapp
*Attorney, Agent, or Firm*—Klauber & Jackson

[57] ABSTRACT

A process of preparing clad contact material comprises forming a contact belt-like member by bonding an Au or Au alloy tape to the surface of an Ag or Ag alloy tape, thermally treating that contact member for forming an Au diffusion layer, and cladding that contact member having the Au diffusion layer to a base belt-like member made of Cu or a Cu alloy. Since, according to the process, the thermal diffusion treatment is carried out before the contact belt-like member is set in the base belt-like member, the thermal diffusion treatment of the contact belt-like member can be performed in the most suitable conditions for obtaining an Au diffusion layer with excellent characteristics, and no dissolution may occur at the interface between the two belt-like members.

2 Claims, 2 Drawing Sheets

PROCESS OF PREPARING CLAD CONTACT MATERIAL

BACKGROUND OF THE INVENTION

The present invention relates to an improvement of a process of preparing clad contact material employed in a slide component such as a commitator for a micromotor.

Clad contact material 6 shown in FIG. 3 and employed for a slide component such as a commitator for a micromotor may be conventionally prepared by cladding a contact belt-like member 3 formed by bonding an Au or Au alloy tape 2 to the surface of an Ag alloy tape 1 shown in FIG. 1, to the surface of a base belt-like member 4 as shown in FIG. 2, and then thermally treating the said base member 4 for effecting the diffusion on the surface thereof.

The thus prepared clad contact material 6 may be insufficient in the contact performances due to possible contact instabilities and abnormal abrasion under circumstances in which a special use is conducted. This is because the gradation of the Au concentration is not uniform nor stable. Depending on the temperature of the thermal diffusion treatment, the Ag alloy of the contact belt-like member 3 and the Cu or Cu alloy of the base belt like member 4 may react with each other at the interface therebetween to make an eutectic which is easily dissolved, so that the clad contact material 6 having the stable Au diffusion layer 5 may not be obtained.

SUMMARY OF THE INVENTION

An object of the present invention is to provide a process of preparing clad contact material having superior contact characteristics.

Another object is to provide a process of preparing clad contact material without the dissolution at the interface.

The present invention is a process of preparing clad contact material which comprises thermally treating a contact belt-like member formed by bonding an Au or Au alloy tape to the surface of an Ag or Ag alloy tape for forming an Au diffusion layer, and cladding this contact belt-like member having the Au diffusion layer to a base belt-like member made of Cu or a Cu alloy.

DETAILED DESCRIPTION OF THE INVENTION

Since, according to the process of the invention, the thermal diffusion treatment of the contact belt-like member formed by bonding the Au or Au alloy tape is carried out before the cladding it to the surface of the base belt-like member, the thermal diffusion treatment conditions can be made most suitable to enable the preparation of the Au diffusion contact material of desired characteristics without the consideration to the bonding to the base belt-like member. For example, the contact material preferably possesses a graded Au concentration, that is, the nearer to the surface thereof, the higher its Au concentration of the contact material becomes. By employing the process of the invention, the stable Au diffusion layer with the uniform gradation can be realized.

Further, the cladding of the contact belt-like member having the said Au diffusion layer to the base belt-like member may be performed without heat, the eutectic mixture of the Ag alloy and the Cu or the Cu alloy is not formed at the interface between them.

The thermal treatment of the contact material in the process of the present invention is preferably conducted at a temperature between 600° and 850° C., and for a diffusion period between 10 and 600 seconds. The reasons are that the temperature below 600° C. produces insufficient diffusion and the temperature over 850° C. may result in the melting of the material, and that the diffusion period less than 10 seconds also produces insufficient diffusion and the diffusion period more than 600 second may not provide a desired concentrated gradation.

EXAMPLES

Examples of the present invention will be described, however, these examples are not construed to restrict the present invention.

EXAMPLE 1

Figure 1:
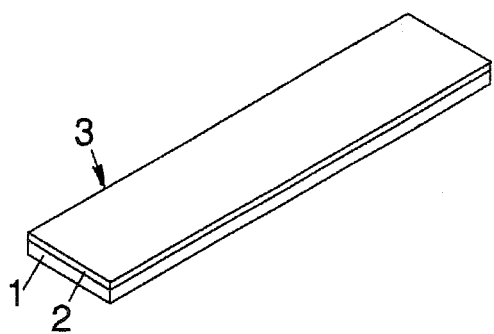
FIGS. 1 to 3 are perspective views illustrating a conventional process of preparing clad contact material.
Figure 2:
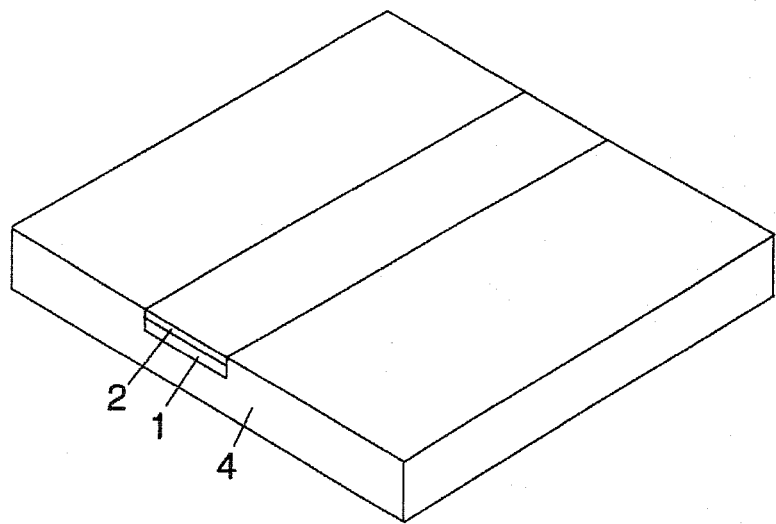
Figure 3:
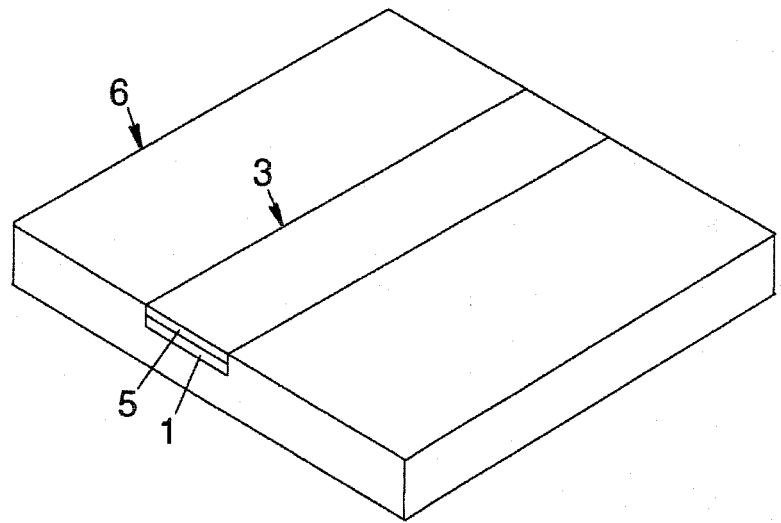
Figure 4:
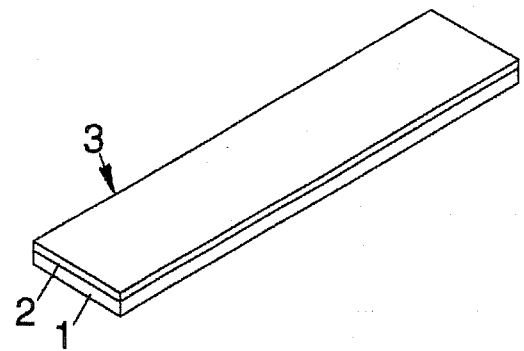
FIG. 4 to 6 are perspective views illustrating a process of preparing clad contact material according to the present invention.
Figure 5:
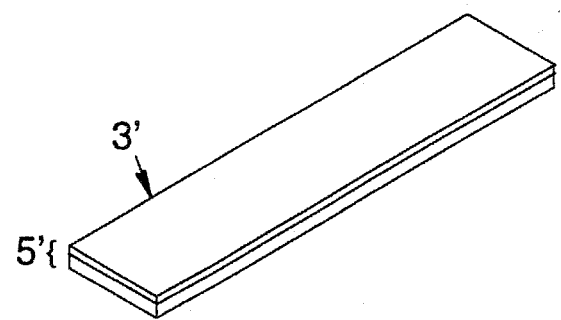
Figure 6:
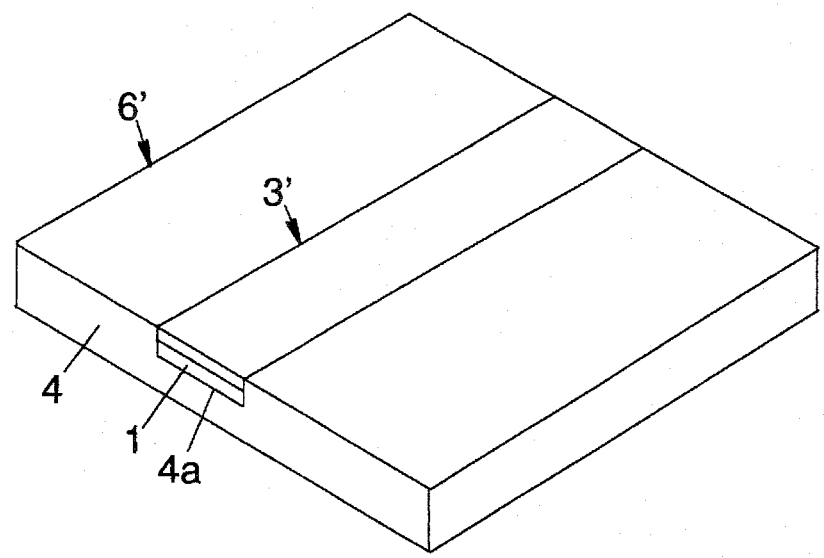

As shown in FIG. 4, a contact belt-like member 3 formed by bonding an Au tape 2 having a thickness of 0.01 mm and a width of 3.0 mm to the surface of a tape 1 consisting of Ag-Cu (4 wt. %)-Ni(0.5 wt. %) and having a thickness of 0.15 mm and a width of 3.0 mm was thermally treated under the conditions at a temperature of 600° C. for a period of 420 seconds to form, as shown in FIG. 5, an Au diffusion layer 5'. Thereafter, the contact belt-like member 3' having the Au diffusion layer 5' was clad by setting it in a groove 4a having a width of 2.9 mm and a depth of 0.2 mm and formed on the central portion of a base belt-like member 4 consisting of Cu-Ni (9.5 wt. %)-Sn (2.3 wt. %) and having a thickness of 1.5 mm and a width of 25 mm to obtain clad contact material 6' as shown in FIG. 6.

EXAMPLES 2 TO 4

Similarly, another three clad contact materials 6' are prepared according to the same conditions of Example 1 except for the temperature and the period of treatment as specified in a below Table.

TABLE

|  | Exam. 1 | Exam. 2 | Exam. 3 | Exam. 4 | Comp. Exam. 1 |
| --- | --- | --- | --- | --- | --- |
| Temperature (°C.) | 600 | 650 | 750 | 850 | 550 |
| Treatment Time (sec) | 420 | 300 | 120 | 20 | 300 |
| Abrasion Loss (µg) | 1 | 1 | 2 | 2 | 10 |

COMPARATIVE EXAMPLE 1

Another clad contact material was obtained under the same conditions as those of Example 1 except that the thermal treatment was conducted at a low temperature after the contact belt-like member was set in the groove. Since the thermal treatment was conducted at the low temperature to depress the dissolution at the interface, the Au was not uniformly dispersed in the diffusion layer so that the large abrasion loss was observed.

Investigation of the five clad contact material revealed that all the Au diffusion layer of the Examples 1 to 4 had a graded Au concentration such that the nearer to the surface of the substrate of the Au diffusion contact material, the higher its Au concentration becomes, and that the gradation was uniform and stable so that the abrasion loss was little. Further, no dissolution was observed at the interface between the contact belt-like member and the base belt-like member.

On the other hand, the clad contact material of Comparative Example 1 had a non-uniform gradation so that its abrasion loss was large.

What is claimed is:

1. A process of preparing clad contact material which comprises forming a contact belt-shaped member formed by bonding an Au or Au alloy tape, thermally treating said contact belt-shaped member to the surface of an Ag or Ag alloy tape for forming an Au diffusion layer and, cladding said contact belt-shaped member having the Au diffusion layer to a base belt-shaped member made of Cu or a Cu alloy.

2. The process as claimed in claim 1, wherein the temperature of the thermal diffusion treatment is between 600° and 850° C. and the period of such treatment is between 10 and 600 seconds.

* * * * *